(12) United States Patent
Chen

(10) Patent No.: US 6,244,405 B1
(45) Date of Patent: Jun. 12, 2001

(54) FREE-WHEEL HUB TRANSMISSION MECHANISM

(75) Inventor: Hubert Chen, Taichung Hsien (TW)

(73) Assignee: Kun Teng Industry Co., Ltd., Taichung Hsien (TW)

(*) Notice: Subject to any disclaimer, the term of this patent is extended or adjusted under 35 U.S.C. 154(b) by 0 days.

(21) Appl. No.: 09/452,803

(22) Filed: Dec. 2, 1999

(51) Int. Cl.$^7$ .................................................. F16D 41/24
(52) U.S. Cl. .................................................. 192/64; 192/94
(58) Field of Search .................. 192/64, 41 R, 192/94, 93 A

(56) References Cited

U.S. PATENT DOCUMENTS

| 4,593,799 | * | 6/1986 | Ozaki | 192/46 |
| 4,829,841 | * | 5/1989 | Ogawa | 74/127 |
| 5,669,477 | * | 9/1997 | Chen | 192/64 |
| 5,718,315 | | 2/1998 | Chen . | |
| 5,964,332 | * | 10/1999 | King | 192/64 |

FOREIGN PATENT DOCUMENTS 59-175637 * 10/1984 (JP).

* cited by examiner

Primary Examiner—Rodney H. Bonck
(74) Attorney, Agent, or Firm—Ohlandt, Greeley, Ruggiero & Perle, L.L.P.

(57) ABSTRACT

A free-wheel hub transmission mechanism includes an axle coaxially inserted into a through hole of a spoke mounting barrel such that a right axle portion thereof extends outwardly from the spoke mounting barrel. A drive transmission block is disposed in the right end portion and has a force transmitting portion with first and second bevel faces. A sprocket mounting barrel is disposed around the right axle portion, and has a drive portion formed with a third bevel face for contacting the first bevel face. A clutch barrel is disposed around the axle, and has a coupling part threaded to the drive portion of the sprocket mounting barrel, and a block contacting part formed with a fourth bevel face for contacting the second bevel face. The clutch barrel is linearly displaceable relative to the axle to a driving position, where the clutch barrel cooperates with the sprocket mounting barrel to clamp the drive transmission block.

4 Claims, 6 Drawing Sheets

US 6,244,405 B1

FREE-WHEEL HUB TRANSMISSION MECHANISM

BACKGROUND OF THE INVENTION

1. Field of the Invention

The present invention relates to a free-wheel hub transmission mechanism for a bicycle.

2. Description of the Related Art

Referring to FIGS. 1 and 2, a conventional free-wheel hub transmission mechanism 10 according to U.S. Pat. No. 5,718,315 is shown to include an axle 12, a spoke mounting barrel 11 rotatably mounted on the axle 12 by means of first and second bearing units 14, a sprocket mounting barrel 13 which is rotatably mounted on the axle 12 by a third bearing unit 14 for driving the spoke mounting barrel 11 and which has a threaded portion 131 extending into the through-hole 111 of the spoke mounting barrel 11 and a sprocket mounting portion 132 extending outwardly of the spoke mounting barrel 11, and a sprocket (not shown) mounted on the sprocket mounting portion 132. A hollow reinforcing body 113 is provided in the through-hole 111 around the axle 12 and is coupled to the spoke mounting barrel 11 for simultaneous rotation therewith. A clutch barrel 15 is disposed in the through-hole 111 of the spoke mounting barrel 11 around the axle 12, and has a coupling portion which engages threadedly the threaded portion 131 of the sprocket mounting barrel 13 and a driving portion 151 which extends into and which drives the reinforcing body 113. A compression spring 16 is mounted in the through-hole 111 around the axle 12 to bias the clutch barrel 15 against the reinforcing body 113. A cup 18 is mounted in the through-hole 111 of the spoke mounting barrel 11 around the axle 12 and is secured in place by a respective lock nut 19 to stop the clutch barrel 15 and the compression spring 16 from moving to the right. The clutch barrel 15 is movable along the axle 12 toward the reinforcing body 113 for frictional engagement therewith upon rotation of the sprocket mounting barrel 13 in a first direction, thereby driving the reinforcing body 113 and the spoke mounting barrel 11 to co-rotate with the sprocket mounting barrel 13. The clutch barrel 15 is disengageable from the reinforcing body 113 upon rotation of the sprocket mounting barrel 13 in a second direction opposite to the first direction.

The reinforcing body 113 has a tapering bore for receiving and engaging frictionally the driving portion 151 of the clutch barrel 15.

The drawbacks of the aforementioned conventional free-wheel hub transmission mechanism are as follows:

A frictional clamping force (F) will result between the clutch barrel 15 and the reinforcing body 113 when the sprocket mounting barrel 13 rotates in the first direction. The clamping force (F) can be broken into axial and radial components (Fx,Fy), and the radial component (Fy) is usually absorbed during rotation of the assembly. However, the axial component (Fx) will cause an axial outward expelling effect on the reinforcing body 113 and the sprocket mounting barrel 13 relative to the spoke mounting barrel 11 that can affect smooth rotation of the hub transmission mechanism and that will result in a shorter service life.

SUMMARY OF THE INVENTION

Therefore, the object of this invention is to provide a free-wheel hub transmission mechanism which includes a clutch barrel that cooperates with a sprocket mounting barrel to clamp a driving transmission block on a spoke mounting barrel such that axial components of the clamping forces cancel each other to ensure smooth operation and a long service life for the hub transmission mechanism.

Accordingly, a free-wheel hub transmission mechanism of the present invention includes an axle with left and right axle portions, a tubular spoke mounting barrel, a drive transmission block, a tubular sprocket mounting barrel, a tubular clutch barrel, and a stop unit, and a friction unit. The spoke mounting barrel has left and right end portions, and a longitudinal through-hole that extends in an axial direction through the left and right end portions. The axle extends co-axially through the longitudinal through-hole such that the right axle portion of the axle is disposed outwardly of the spoke mounting barrel. The spoke mounting barrel is provided with a first bearing unit for mounting rotatably the same on the left axle portion. The drive transmission block is disposed in the right end portion of the spoke mounting barrel, and has a coupling portion that forms a spline connection with the right end portion of the spoke mounting barrel such that the drive transmission block is linearly displaceable in the axial direction and is non-rotatable relative to the spoke mounting barrel. The drive transmission block further has a force transmitting portion that extends from the coupling portion and that projects radially into the through-hole. The force transmitting portion has opposite ends spaced apart from each other in the axial direction, and first and second bevel faces between the opposite ends. The first bevel face is proximate to one of the opposite ends that is adjacent to an open side of the right end portion of the spoke mounting barrel. The second bevel face is proximate to the other one of the opposite ends that is distal to the open side of the right end portion of the spoke mounting barrel. The sprocket mounting barrel is disposed around the right axle portion of the axle, and has an axle mounting portion provided with a second bearing unit for mounting rotatably the same on the right axle portion, and a drive portion that extends from the axle mounting portion in the axial direction toward the right end portion of the spoke mounting barrel and that is formed with a first screw thread. The drive portion is further formed with a third bevel face for contacting the first bevel face. The clutch barrel is disposed around the axle, and has a block contacting part that is disposed inside the right end portion of the spoke mounting barrel, and a coupling part that extends from the block contacting part and that is formed with a second screw thread for coupling threadedly with the first screw thread of the drive portion of the sprocket mounting barrel. The block contacting part is formed with a fourth bevel face for contacting the second bevel face. The clutch barrel is linearly displaceable relative to the axle between a driving position, where the clutch barrel cooperates with the sprocket mounting barrel to clamp the drive transmission block therebetween by virtue of tight contact of the third and fourth bevel faces with the first and second bevel faces such that rotation of the sprocket mounting barrel relative to the axle is transmitted to the spoke mounting barrel via the drive transmission block. The clutch barrel is further linearly displaceable relative to the axle from the driving position to an idling position, where the fourth bevel face ceases to contact the second bevel face tightly to prevent the rotation of the sprocket mounting barrel relative to the axle from being transmitted to the spoke mounting barrel. The stop unit is disposed on the axle for limiting movement of the clutch barrel toward the idling position. The friction unit provides resistance to rotation of the clutch barrel relative to the axle, thereby enabling linear displacement of the clutch barrel relative to the axle to permit movement of the clutch barrel between the driving and idling positions when the sprocket mounting barrel rotates, and permitting the clutch barrel to rotate with the sprocket mounting barrel when the clutch barrel has reached the driving and idling positions.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
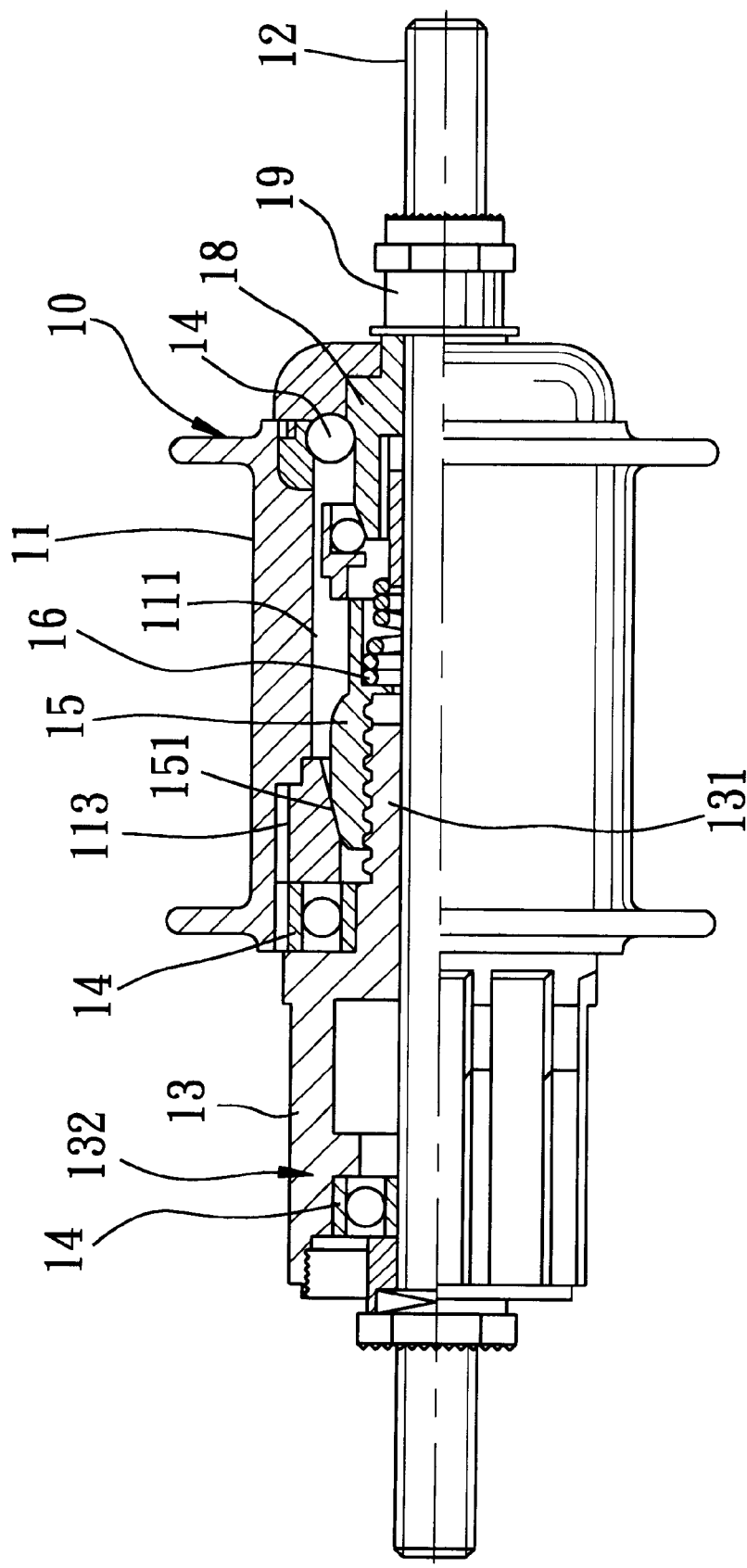
FIG. 1 is a fragmentary sectional view of a conventional free-wheel hub transmission mechanism.
Figure 2:
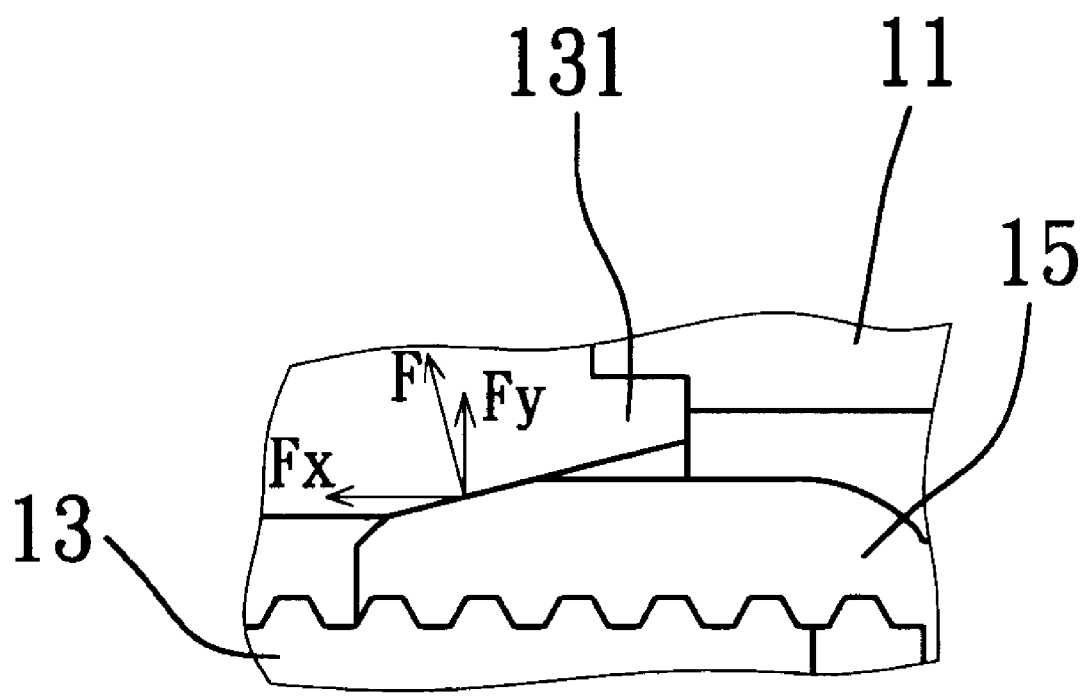
FIG. 2 is a fragmentary schematic view of the conventional hub transmission mechanism, illustrating how a clamping force is broken into axial and radial components.
Figure 3:
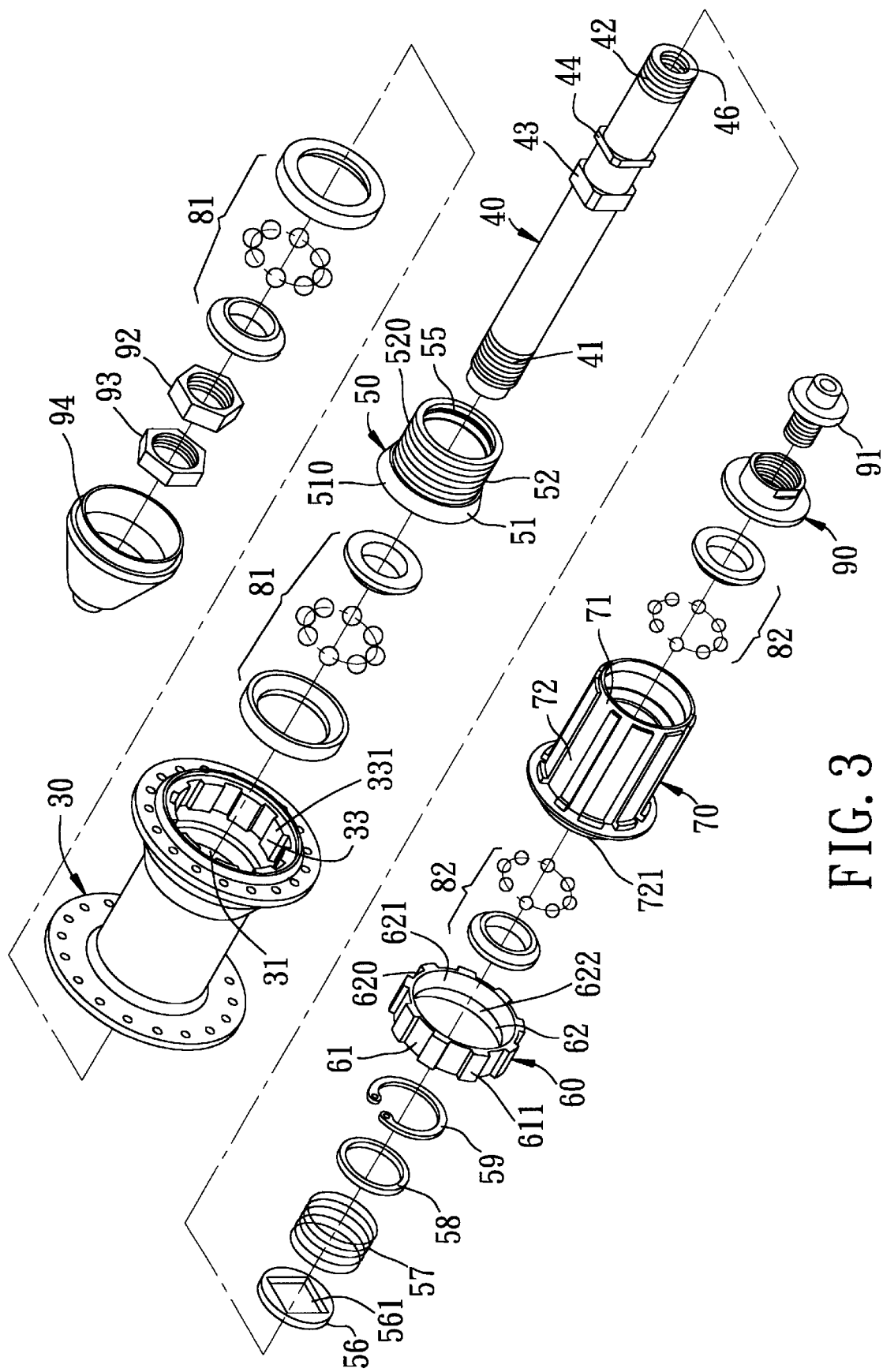
FIG. 3 is an exploded perspective view of a preferred embodiment of a free-wheel hub transmission mechanism of the present invention.
Figure 4:
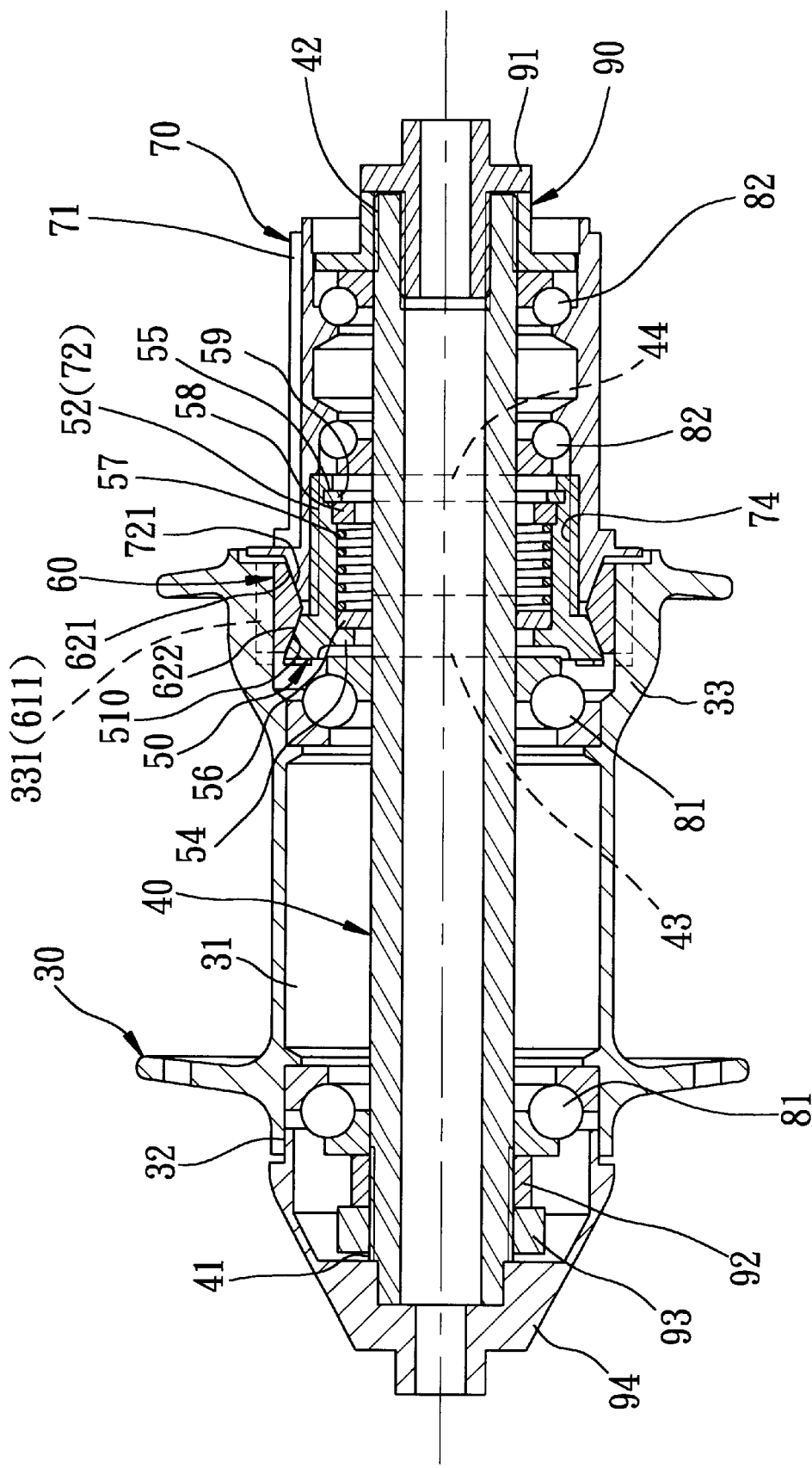
FIG. 4 is a sectional view of the preferred embodiment in a driving state.
Figure 5:
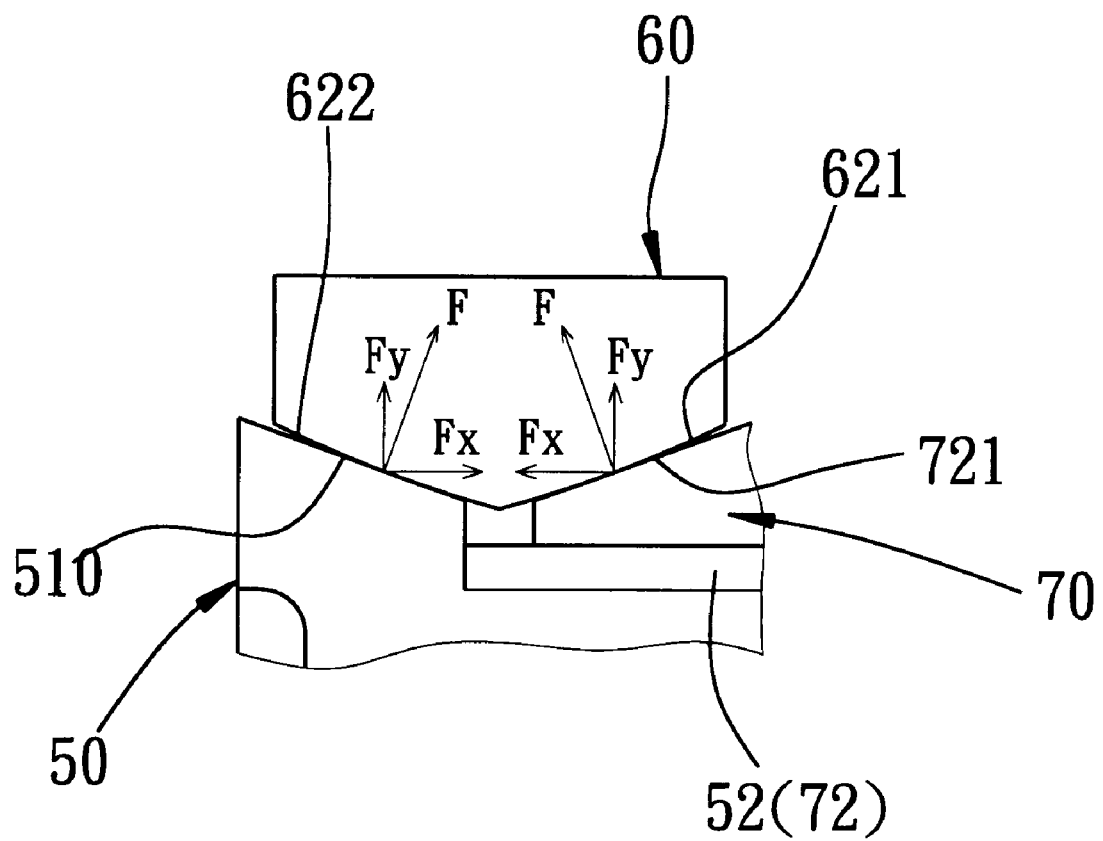
FIG. 5 is a fragmentary schematic view of the preferred embodiment, illustrating how clamping forces are broken into axial and radial components.

Referring to FIGS. 3, 4 and 5, the preferred embodiment of a free-wheel transmission mechanism of the present invention is shown to include an axle 40 with left and right axle portions 41,42, a tubular spoke mounting barrel 30, a drive transmission block 60, a tubular sprocket mounting barrel 70, and a tubular clutch barrel 50.

As illustrated, the spoke mounting barrel 30 has left and right end portions 32,33, and a longitudinal through-hole 31 that extends in an axial direction through the left and right end portions 32,33. When the spoke mounting barrel 30 is disposed around the axle 40, the latter extends co-axially through the longitudinal through-hole 31 such that the right axle portion 42 of the axle 40 is disposed outwardly of the spoke mounting barrel 30. The spoke mounting barrel 30 is provided with a pair of first bearing units 81 for mounting rotatably the same on the left axle portion 41 of the axle 40. A beating retention nut 92 is mounted threadedly on the left axle portion 41, which is further secured by a locking nut 93 successively threaded on the left axle portion 41. A cap 94 is inserted into the left end portion 32 of the spoke mounting barrel 30.

The drive transmission block 60 is disposed in the right end portion 33 of the spoke mounting barrel 30, and has a coupling portion 61 that forms a spline connection with the right end portion 33 of the spoke mounting barrel 30 such that the drive transmission block 60 is linearly displaceable in the axial direction and is non-rotatable relative to the spoke mounting barrel 30. The drive transmission block 60 further has a force transmitting portion 62 that extends from the coupling portion 61 and that projects radially into the longitudinal through-hole 31 of the spoke mounting barrel 30. The force transmitting portion 62 has opposite ends 620 spaced apart from each other in the axial direction, and first and second bevel faces 621,622 between the opposite ends 620. The first bevel face 621 is proximate to one of the opposite ends 620 that is adjacent to an open side of the right end portion 33 of the spoke mounting barrel 30. The second bevel face 622 of the force transmission portion 62 is proximate to the other one of the opposite ends 620 that is distal to the open side 33 of the spoke mounting barrel 30.

The sprocket mounting barrel 70 is disposed around the right axle portion 42 of the axle 40, and has an axle mounting portion 71 provided with a pair of second bearing units 82 for mounting rotatably the same on the right axle portion 42, and a drive portion 72 that extends from the axle mounting portion 71 in the axial direction toward the right end portion 33 of the spoke mounting barrel 30 and that is formed with a first screw thread 74. The drive portion 72 of the sprocket mounting barrel 70 is further formed with a third bevel face 721 for contacting the first bevel face 621 of the force transmitting portion 62 of the drive transmission block 60.

The clutch barrel 50 is disposed around the axle 40, and has a block contacting part 51 that is disposed inside the right end portion 33 of the spoke mounting barrel 30, and a coupling part 52 that extends from the block contacting part 51 and that is formed with a second screw thread 520 for coupling threadedly with the first screw thread 74 of the drive portion 72 of the sprocket mounting barrel 70. The block contacting part 51 is formed with a fourth bevel face 510 for contacting the second bevel face 622 of the force transmitting portion 62 of the drive transmission block 60. The clutch barrel 50 is linearly displaceable relative to the axle 40 between a driving position, where the clutch barrel 50 cooperates with the sprocket mounting barrel 70 to clamp the drive transmission block 60 therebetween, as best shown in FIG. 4, by virtue of tight contact of the third and fourth bevel faces 721, 510 with the first and second bevel faces 621, 622 of the force transmitting portion 62 such that rotation of the sprocket mounting barrel 70 relative to the axle 40 is transmitted to the spoke mounting barrel 30 via the drive transmission block 60. The clutch barrel 50 is further linearly displaceable relative to the axle 40 from the driving position of FIG. 4 to an idling position of FIG. 6, where the fourth bevel face 510 ceases to contact the second bevel face 622 tightly to prevent the rotation of the sprocket mounting barrel 70 relative to the axle 40 from being transmitted to the spoke mounting barrel 30.

A stop member is disposed on the axle 40 for limiting movement of the clutch barrel 50 toward the idling position. In the preferred embodiment, one of the first bearing units 81 serves as the stop member. Since the structure of the first bearing units 81 and the second bearing units 82 are not critical to the present invention, a detailed description thereof is omitted herein for the sake of brevity.

Figure 6:
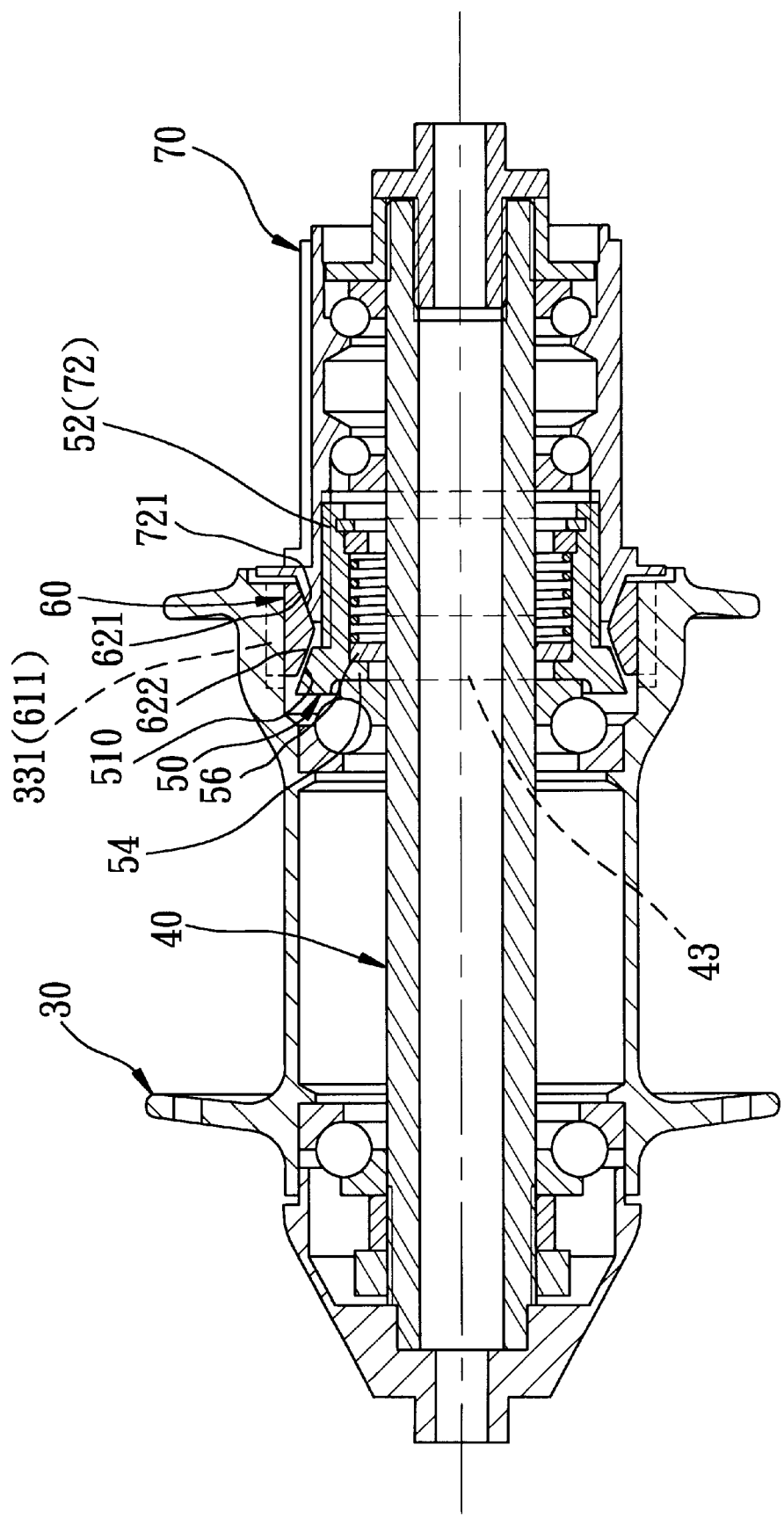
FIG. 6 is a sectional side view of the preferred embodiment in an idling state.

A friction unit provides resistance to rotation of the clutch barrel 50 relative to the axle 40, thereby enabling linear displacement of the clutch barrel 50 relative to the axle 40 to permit movement of the clutch barrel 50 between the driving and idling positions when the sprocket mounting barrel 70 rotates, and permitting the clutch barrel 50 to rotate with the sprocket mounting barrel 70 when the clutch barrel 50 has reached the driving and idling positions, as shown in FIGS. 4 and 6. The friction unit includes a radial inward flange 54 that is formed in the clutch barrel 50 and that extends radially and inwardly toward the axle 40, a clutch disc 56 mounted slidably and non-rotatably on the axle 40, a washer 58 disposed in the clutch barrel 50 around the axle 40, and a compression spring 57 between the clutch disc 56 and the washer 58 and that serves biasing means for biasing the clutch disc 56 against the radial inward flange 54 to establish friction contact therebetween. A fastener ring 59 is retained in a recess 55 of the clutch barrel 50 for retaining 56,57,58 inside the clutch barrel 50. Preferably, the clutch disc 56 is formed with a rectangular hole 561 for sleeving slidably and non-rotatably on a rectangular limit block 43 formed on the right axle portion 42 of the axle 40.

In the preferred embodiment, the right end portion 33 of the spoke mounting barrel 30 has an inner wall surface formed with a plurality of first engaging splines 331 that extend in the axial direction. The coupling portion 61 of the drive transmission block 60 is a ring portion which has an outer wall surface that is formed with a plurality of second engaging splines 611 for meshing with the first engaging splines 331 in the axial direction.

The force transmitting portion 62 of the drive transmission block 60 extends in a radial inward direction from the coupling portion 61, and tapers in the radial inward direction to form the force transmitting portion 62 with the first and second bevel faces 621,622. A bearing retention nut 90 is mounted threadedly on the right axle portion 42 of the axle 40 and cooperates with a bearing limit block 44 which is formed on the right axle portion 42 to prevent linear displacement of the sprocket mounting barrel 70 relative to the axle 40 during rotation thereof. A locking bolt 91 is screwed into a screw hole 46 formed in the right axle portion 42 to further enhance the engagement of the bearing retention nut 90 with the axle 40.

Referring to FIGS. 3 and 5, when the clutch barrel 50 is moved linearly on the axle 40 to the driving position so as to and cooperate with the sprocket mounting barrel 70 to clamp the drive transmission block 60 by virtue of tight contact of the third and fourth bevel faces 721, 510 with the first and second bevel faces 621,622 of the force transmitting portion 62, the clamping forces (F) between the bevel faces and that result from the rotation of the sprocket mounting barrel 70 in the first direction can be divided into axial and radial components Fx,Fy, wherein the radial components Fy are absorbed during rotation of the assembly. Since the axial components Fx counteract and thus cancel each other, no axial force acts on the clutch barrel 50 and the sprocket mounting barrel 70, thereby ensuring smooth operation and prolonging life service of the hub transmission mechanism of the preferred embodiment.

When the clutch barrel 50 is moved linearly on the axle 40 to the idling position due to rotation of the sprocket mounting barrel 70 in the second direction opposite to the first direction, the clutch barrel 50 will eventually co-rotate with the sprocket mounting barrel 70 due to collision between the inward flange 54 of the clutch barrel 50 and one of the first bearing units 81.

With this invention thus explained, it is apparent that numerous modifications and variations can be made without departing from the scope and spirit of this invention. It is therefore intended that the invention be limited only as indicated in the appended claims.

I claim:

1. A free-wheel hub transmission mechanism comprising:

an axle having left and right axle portions;

a tubular spoke mounting barrel having left and right end portions, and a longitudinal through-hole extending in an axial direction through said left and right end portions, said axle extending co-axially through said longitudinal through-hole such that said right axle portion is disposed outwardly of said spoke mounting barrel, said spoke mounting barrel being provided with first bearing means for mounting rotatably said spoke mounting barrel on said left axle portion;

a drive transmission block disposed in said right end portion of said spoke mounting barrel, and having a coupling portion that forms a spline connection with said right end portion of said spoke mounting barrel such that said drive transmission block is linearly displaceable in the axial direction and is non-rotatable relative to said spoke mounting barrel, said drive transmission block further having a force transmitting portion that extends from said coupling portion and that projects radially into said longitudinal through-hole, said force transmitting portion having opposite ends in the axial direction, and extending in a radial inward direction from said coupling portion, and tapering in the radial inward direction to form said force transmitting portion with complementary first and second bevel faces between the opposite ends, said first bevel face being proximate to one of the opposite ends that is adjacent to an open side of said right end portion of said spoke mounting barrel, said second bevel face being proximate to the other one of the opposite ends;

a tubular sprocket mounting barrel disposed around said right axle portion, said sprocket mounting barrel having an axle mounting portion provided with second bearing means for mounting rotatably said sprocket mounting barrel on said right axle portion, and a drive portion extending from said axle mounting portion in the axial direction toward said right end portion of said spoke mounting barrel and formed with a first screw thread, said drive portion being formed with a third bevel face for contacting said first bevel face;

a tubular clutch barrel disposed around said axle and having a block contacting part that is disposed inside said right end portion of said spoke mounting barrel and a coupling part that extends from said block contacting part and that is formed with a second screw thread for coupling threadedly with said first screw thread of said drive portion of said sprocket mounting barrel, said block contacting part being formed with a fourth bevel face for contacting said second bevel face, said clutch barrel being linearly displaceable relative to said axle between a driving position, where said clutch barrel cooperates with said sprocket mounting barrel to clamp said drive transmission block therebetween by virtue of tight contact of said third and fourth bevel faces with said first and second bevel faces such that rotation of said sprocket mounting barrel relative to said axle is transmitted to said spoke mounting barrel via said drive transmission block, and an idling position, where said fourth bevel face ceases to contact said second bevel face tightly to prevent the rotation of said sprocket mounting barrel relative to said axle from being transmitted to said spoke mounting barrel;

stop means disposed on said axle for limiting movement of said clutch barrel toward the idling position; and friction means for providing resistance to rotation of said clutch barrel relative to said axle, thereby enabling linear displacement of said clutch barrel relative to said axle to permit movement of said clutch barrel between the driving and idling positions when said sprocket mounting barrel rotates, and permitting said clutch barrel to rotate with said sprocket mounting barrel when said clutch barrel has reached the driving and idling positions.

2. The free-wheel hub transmission mechanism as defined in claim 1, wherein said right end portion of said spoke mounting barrel has an inner wall surface formed with a plurality of first engaging splines that extend in the axial direction, said coupling portion of said drive transmission block being a ring portion which has an outer wall surface that is formed with a plurality of second engaging splines for meshing with said first engaging splines in the axial direction.

3. The free-wheel hub transmission mechanism as defined in claim 1, wherein said first bearing means also serves as said stop means.

4. The free-wheel hub transmission mechanism as defined in claim 1, wherein said friction means includes:

a radial inward flange formed in said clutch barrel and extending radially and inwardly toward said axle;

a clutch disc mounted slidably and non-rotatably on said axle; and biasing means for biasing said clutch disc against said radial inward flange to establish friction contact therebetween.

* * * * *